United States Patent
Unoura

(10) Patent No.: US 7,920,721 B2
(45) Date of Patent: Apr. 5, 2011

(54) VEHICLE-USE IMAGE PROCESSING SYSTEM, VEHICLE-USE IMAGE PROCESSING METHOD, VEHICLE-USE IMAGE PROCESSING PROGRAM, VEHICLE, AND METHOD OF FORMULATING VEHICLE-USE IMAGE PROCESSING SYSTEM

(75) Inventor: Kiyozumi Unoura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 861 days.

(21) Appl. No.: 11/886,566

(22) PCT Filed: Mar. 16, 2006

(86) PCT No.: PCT/JP2006/305257
§ 371 (c)(1),
(2), (4) Date: Sep. 18, 2007

(87) PCT Pub. No.: WO2006/101004
PCT Pub. Date: Sep. 28, 2006

(65) Prior Publication Data
US 2008/0317282 A1    Dec. 25, 2008

(30) Foreign Application Priority Data
Mar. 22, 2005  (JP) .................................. 2005-082826

(51) Int. Cl.
*G06K 9/00* (2006.01)
(52) U.S. Cl. ...................................................... 382/104
(58) Field of Classification Search .......................... None
See application file for complete search history.

(56) References Cited

U.S. PATENT DOCUMENTS

| | | | | |
|---|---|---|---|---|
| 5,521,633 A * | 5/1996 | Nakajima et al. | ............. | 348/118 |
| 5,889,878 A * | 3/1999 | Togashi | ........................ | 382/103 |
| 5,987,174 A * | 11/1999 | Nakamura et al. | ............ | 382/199 |
| 6,493,458 B2 * | 12/2002 | Yasui et al. | .................... | 382/104 |
| 6,590,521 B1 | 7/2003 | Saka et al. | | |
| 7,362,883 B2 * | 4/2008 | Otsuka et al. | ................. | 382/104 |
| 7,676,094 B2 * | 3/2010 | Hoki et al. | .................... | 382/199 |
| 2002/0031242 A1 * | 3/2002 | Yasui et al. | .................... | 382/104 |
| 2002/0042676 A1 | 4/2002 | Furusho | | |
| 2003/0103650 A1 * | 6/2003 | Otsuka et al. | ................. | 382/104 |
| 2006/0239509 A1 * | 10/2006 | Saito | ............................ | 382/104 |

FOREIGN PATENT DOCUMENTS

| | | |
|---|---|---|
| EP | 0 827 127 A1 | 3/1998 |
| JP | 11-147473 A | 6/1999 |
| JP | 11-147481 A | 6/1999 |
| JP | 2001-092970 A | 4/2001 |
| JP | 2001-256484 A | 9/2001 |
| JP | 2005-157731 A | 6/2005 |

* cited by examiner

*Primary Examiner* — Yuzhen Ge
(74) *Attorney, Agent, or Firm* — Arent Fox, LLP

(57) ABSTRACT

A system or the like capable of detecting lane marks more accurately by preventing false lane marks from being erroneously detected as true lane marks. A vehicle-use image processing system (100) allows a "road surface cluster" to be extracted from the "histogram" of luminance of each pixel in a "reference area" in a road surface image. Among "primary lane mark candidates," those that overlap the "reference area" are detected as "secondary lane mark candidates." Among the "secondary lane mark candidates," those that have "luminance parameter" values falling within the luminance range of the "road surface cluster" are not detected as true lane marks. Thereby, lane marks are prevented from being erroneously detected (erroneous detection). This allows only lane marks to be detected more accurately.

14 Claims, 13 Drawing Sheets

VEHICLE-USE IMAGE PROCESSING SYSTEM, VEHICLE-USE IMAGE PROCESSING METHOD, VEHICLE-USE IMAGE PROCESSING PROGRAM, VEHICLE, AND METHOD OF FORMULATING VEHICLE-USE IMAGE PROCESSING SYSTEM

CROSS-REFERENCE TO RELATED APPLICATION

This application is a National Stage entry of International Application No. PCT/JP2006/305257, filed Mar. 16, 2006, the entire specification claims and drawings of which are incorporated herewith by reference.

TECHNICAL FIELD

The present invention relates to a vehicle-use image processing system, a vehicle-use image processing method, a vehicle-use image processing program, a vehicle, and a method of formulating a vehicle-use image processing system.

BACKGROUND ART

Conventionally, there has been suggested a technical method for detecting white lines or other lane marks from a road surface image ahead of a vehicle captured by a camera mounted on the vehicle (for example, refer to Japanese Patent Laid-Open No. Hei 11(1999)-147481 and Japanese Patent Laid-Open No. Hei 11(1999)-147473). The detection result of the lane marks is used to control, for example, a lateral position of the vehicle with reference to the positions of the lane marks located on both sides of the vehicle.

According to the conventional technology, the white lines are detected by utilizing a property that the luminance of the white lines included in the road surface image is higher than those of other portions of the road surface.

DISCLOSURE OF THE INVENTION

Problems to be Solved by the Invention

According to the conventional technology, however, in the case where a guide rail G extends along the road on the left side of the vehicle and a light such as a sunlight is incident on the road surface from diagonally above on the left as shown in FIG. 10, the luminance of the road surface portion M' between a pair of parallel shadows S of the guardrail G can be detected as a portion higher in luminance than the left and right shadows S similarly to the white line M. Therefore, there is a possibility that the road surface portion (false white line) M' is erroneously detected as a white line. In addition, the lateral position control of the vehicle based on the detection result of the white line could be an inappropriate one such that a driver feels uncomfortable in light of an actual white line.

Therefore, it is an object of the present invention to provide a system, method, and vehicle capable of detecting lane marks more accurately by preventing false lane marks from being erroneously detected as true lane marks, a program which gives the detection function of lane marks to a computer, and a method of formulating the system.

Means for Solving the Problems

According to an aspect of the present invention to solve the above problem, there is provided a vehicle-use image processing system which performs image processing on the basis of a road surface image captured by an imaging device mounted on a vehicle, comprising: a reference area setting unit which sets a reference area corresponding to a road surface portion other than a lane mark in the road surface image captured by the imaging device; a histogram preparing unit which prepares a histogram by measuring the frequency of luminance of each pixel of the road surface image in the reference area set by the reference area setting unit; a road surface cluster extracting unit which extracts a cluster of portions, which are equal to or higher than a threshold value in width, height, or area, as a road surface cluster from the histogram prepared by the histogram preparing unit; a lane mark candidate detecting unit which detects a lane mark candidate on the basis of the road surface image captured by the imaging device; a luminance parameter calculating unit which calculates luminance parameters based on the luminance of the lane mark candidate detected by the lane mark candidate detecting unit; and a lane mark detecting unit which detects a lane mark candidate whose luminance parameters calculated by the luminance parameter calculating unit fall within the luminance range of the road surface cluster extracted by the road surface cluster extracting unit as a false lane mark, while detecting a lane mark candidate whose luminance parameters calculated by the luminance parameter calculating unit fall off the luminance range of the road surface cluster extracted by the road surface cluster extracting unit as a true lane mark.

According to the vehicle-use image processing system of the invention, the "road surface cluster" is extracted from the "histogram" of the luminance of each pixel of the "reference area" in the road surface image. Then, only lane mark candidates whose "luminance parameter" values fall off the luminance range of the "road surface cluster" out of the "lane mark candidates" can be detected as true lane marks.

Since the "reference area" corresponds to the road surface portion other than the lane marks, the luminance range of one "road surface cluster" having a width, height or area equal to or higher than a threshold value extracted from the "histogram" of the luminance of each point corresponds to the luminance distribution of the road surface portion other than the lane marks. In addition, the luminance parameters of the "lane mark candidate" falling within the luminance range of the "road surface cluster" means that the lane mark candidate has substantially the same luminance distribution as that of the road portion other than the lane marks. Then, lane mark candidates whose "luminance parameter" values fall within the luminance range of the "road surface cluster" (false lane marks) out of the "lane mark candidates" are prevented from being detected as true lane marks, whereby the lane marks can be prevented from being erroneously detected (erroneous detection). Therefore, true lane marks can be detected with high accuracy.

Moreover, in the vehicle-use image processing system according to the present invention, the reference area setting unit sets an area whose left and right are defined by a pair of offset lines, which are offset closer to the center of the lane than a pair of true lane marks detected by the lane mark detecting unit, as the reference area.

According to the vehicle-use image processing system of the invention, left and right of the reference area are defined by the offset lines, which are offset closer to the center of the lane from the pair of true left and right lane marks. This allows the reference area to be associated with the road surface portion other than the lane marks accurately. Then, the "histogram" and the "road surface cluster" are more accurately associated with the luminance distribution of the road surface portion other than the lane marks, whereby the true lane marks can be detected with higher accuracy.

Furthermore, in the vehicle-use image processing system of the present invention, the reference area setting unit sets the reference area whose top and bottom are defined by lines offset from the upper edge and lower edge of the road surface image, respectively.

According to the vehicle-use image processing system of the invention, resources required for the image processing can be saved by reducing the area of the reference area. In addition, if the image processing result (the detection result of the lane marks) is used for the lateral position control of the vehicle, the top and bottom of the reference area are defined so as to be associated with the range in the traveling direction of the vehicle, whose vehicle lateral position is controlled based on the detection result, whereby an appropriate lateral position control of the vehicle can be achieved.

Moreover, in the vehicle-use image processing system of the present invention, the road surface cluster extracting unit extracts a cluster having a shape whose middle part is higher than both ends as a primary road surface cluster candidate from the histogram prepared by the histogram preparing unit and extracts a primary road surface cluster candidate which is equal to or higher than the threshold value in area as the road surface cluster.

According to the vehicle-use image processing system of the invention, it is possible to extract the road surface cluster having an appropriate luminance range as representation of a luminance distribution of the road surface portion other than the lane marks. This allows the true lane marks to be detected with high accuracy as described above.

Further, in the vehicle-use image processing system of the present invention, if both ends of a plurality of the primary road surface cluster candidates overlap each other and a valley portion generated in the overlap region is shallow in view of the noise components included in the histogram, the road surface cluster extracting unit integrates and extracts the plurality of primary road surface cluster candidates as one secondary road surface cluster candidate and then extracts a secondary road surface cluster candidate which is equal to or higher than a threshold value in area as the road surface cluster.

According to the vehicle-use image processing system of the invention, it is possible to extract a road surface cluster having an appropriate luminance range as representation of the luminance distribution of the road surface portion other than the lane marks by reducing or eliminating the effect of the noise components. This allows true lane marks to be detected with higher accuracy.

Further, in the vehicle-use image processing system according to the present invention, the lane mark candidate detecting unit is composed of a primary lane mark candidate detecting unit which detects all lane mark candidates as primary lane mark candidates and a secondary lane mark candidate detecting unit which detects primary lane mark candidates whose distance from a point on the center line of a vehicle traffic lane is equal to or lower than a threshold value out of the primary lane mark candidates detected by the primary lane mark candidate detecting unit as secondary lane mark candidates; and the luminance parameter calculating unit calculates luminance parameters based on the luminance of the secondary lane mark candidates detected by the secondary lane mark candidate detecting unit.

According to the vehicle-use image processing system of the invention, out of the all lane mark candidates, namely "primary lane mark candidates," those whose distance from the point on the center line of the vehicle traffic lane is equal to or lower than a threshold value are detected as "secondary lane mark candidates." Then, out of the secondary lane mark candidates, those whose luminance parameters fall within the luminance range of the road surface cluster are not erroneously detected as true lane marks as described above. In addition, the secondary lane mark candidates are narrowed down to those whose distance from the point on the center line of the vehicle traffic lane is equal to or lower than the threshold value, whereby the lane marks unlikely to be true lane marks can be removed. Further, narrowing down from the primary lane mark candidates to the secondary lane marks reduces the load on luminance parameter calculation processing.

Further, in the vehicle-use image processing system according to the present invention, the lane mark candidate detecting unit is composed of a primary lane mark candidate detecting unit which detects all lane mark candidates as primary lane mark candidates and a secondary lane mark candidate detecting unit which detects primary lane mark candidates which overlap the reference area set by the reference area setting unit out of the primary lane mark candidates detected by the primary lane mark candidate detecting unit as secondary lane mark candidates and the luminance parameter calculating unit calculates luminance parameters based on the luminance of the secondary lane mark candidates detected by the secondary lane mark candidate detecting unit.

According to the vehicle-use image processing system of the invention, out of all lane mark candidates, namely the "primary lane mark candidates," those which overlap the reference area are detected as the "secondary lane mark candidates." Then, out of the secondary lane mark candidates, those whose luminance parameters fall within the luminance range of the road surface cluster are not erroneously detected as true lane marks as described above. In addition, the secondary lane mark candidates are narrowed down to those overlapping the reference area, whereby those unlikely to true lane marks can be removed. Further, narrowing down from the primary lane mark candidates to the secondary lane marks reduces the load on the luminance parameter calculation processing.

Further, in the vehicle-use image processing system according the present invention, the luminance parameter calculating unit calculates the luminance parameters based on the luminance of the portions overlapping the reference area set by the reference area setting unit out of the secondary lane mark candidates detected by the secondary lane mark candidate detecting unit.

According to the vehicle-use image processing system of the invention, the "road surface histogram" is extracted according to the luminance of the road surface image in the reference area as described above, while the "luminance parameters" are calculated according to the luminance of the road surface image in the reference area. Thereby, true lane marks can be detected with higher accuracy according to whether the luminance parameters fall within the luminance range of the road surface histogram of the reference area.

Further, in the vehicle-use image processing system according to the present invention, if the lane mark candidate detecting unit detects no lane mark candidate, the lane mark detecting unit detects the lane marks detected earlier as true lane marks.

According to the vehicle-use image processing system of the invention, if there is no lane marks candidate (or false lane mark) overlapping the reference area, the lane marks detected earlier can be detected as true lane marks directly.

Further, in the vehicle-use image processing system according to the present invention, the lane mark candidate detecting unit detects edges or edge points of the lane marks closer to the center of the lane as lane mark candidates.

According to the vehicle-use image processing system of the invention, the edges or edge points of the lane marks closer to the center of the lane can be detected as lane marks.

According to another aspect of the present invention to solve the above problem, there is provided a vehicle-use image processing method of performing image processing on the basis of a road surface image captured by an imaging device mounted on a vehicle, comprising: a reference area setting step of setting a reference area corresponding to a road surface portion other than a lane mark in the road surface image captured by the imaging device; a histogram preparing step of preparing a histogram by measuring the frequency of luminance of each pixel of the road surface image in the reference area set in the reference area setting step; a road surface cluster extracting step of extracting a cluster of portions, which are equal to or higher than a threshold value in width, height, or area, as a road surface cluster from the histogram prepared in the histogram preparing step; a lane mark candidate detecting step of detecting a lane mark candidate on the basis of the road surface image captured by the imaging device; a luminance parameter calculating step of calculating luminance parameters based on the luminance of the lane mark candidate detected in the lane mark candidate detecting step; and a lane mark detecting step of detecting a lane mark candidate whose luminance parameters calculated in the luminance parameter calculating step fall within the luminance range of the road surface cluster extracted in the road surface cluster extracting step as a false lane mark, while detecting a lane mark candidate whose luminance parameters calculated in the luminance parameter calculating step fall off the luminance range of the road surface cluster extracted in the road surface cluster extracting step as a true lane mark.

According to the vehicle-use image processing method of the invention, out of the "lane mark candidates," those whose "luminance parameter" values fall within the luminance range of the "road surface cluster" (false lane marks) are prevented from being detected as true lane marks, whereby lane marks are prevented from being erroneously detected (erroneous detection). This allows true lane marks to be detected with higher accuracy.

According to still another aspect of the present invention to solve the above problem, there is provided a vehicle-use image processing program for giving functions of performing image processing on the basis of a road surface image captured by an imaging device mounted on a vehicle, wherein the program gives the computer: a reference area setting function of setting a reference area corresponding to a road surface portion other than a lane mark in the road surface image captured by the imaging device; a histogram preparing function of preparing a histogram by measuring the frequency of luminance of each pixel of the road surface image in the reference area set by the reference area setting function; a road surface cluster extracting function of extracting a cluster of portions, which are equal to or higher than a threshold value in width, height, or area, as a road surface cluster from the histogram prepared by the histogram preparing function; a lane mark candidate detecting function of detecting a lane mark candidate on the basis of the road surface image captured by the imaging device; a luminance parameter calculating function of calculating luminance parameters based on the luminance of the lane mark candidate detected by the lane mark candidate detecting function; and a lane mark detecting function of detecting a lane mark candidate whose luminance parameters calculated by the luminance parameter calculating function fall within the luminance range of the road surface cluster extracted by the road surface cluster extracting function as a false lane mark, while detecting a lane mark candidate whose luminance parameters calculated by the luminance parameter calculating function fall off the luminance range of the road surface cluster extracted by the road surface cluster extracting function as a true lane mark.

According to the vehicle-use image processing program of the invention, out of the "lane mark candidates," those whose "luminance parameter" values fall within the luminance range of the "road surface cluster" (false lane marks) are prevented from being detected as true lane marks, whereby lane marks are prevented from being erroneously detected (erroneous detection). This allows true lane marks to be detected with higher accuracy.

According to still another aspect of the present invention to solve the above problem, there is provided a method of downloading a part or all of a vehicle-use image processing to an in-vehicle computer in order to set up a vehicle-use image processing system.

According to the method of the invention, the system capable of detecting true lane marks with high accuracy can be set up by downloading a part or all of the program to the in-vehicle computer at an arbitrary timing.

According to still another aspect of the present invention to solve the above problem, there is provided a vehicle in which the vehicle-use image processing system.

According to the vehicle of the invention, a high-accuracy detection result of lane marks obtained by the vehicle-use image processing system can be used and, for example, the lateral position of the vehicle can be appropriately controlled on the basis of the detection result.

BEST MODE FOR CARRYING OUT THE INVENTION

The following describes embodiments of a vehicle-use image processing system, a vehicle-use image processing method, a vehicle-use image processing program, and a vehicle according to the present invention with reference to the accompanying drawings.

A vehicle-use image processing system 100 shown in FIG. 1 is composed of an electronic control unit 12 as hardware mounted on the vehicle 10 and a "vehicle-use image processing program" of the present invention as software. Although the vehicle surroundings monitoring program can be stored in a memory of an in-vehicle computer from the start, a part or all of the vehicle surroundings monitoring program can be downloaded from a predetermined server at an arbitrary timing when a request is made by a driver or the in-vehicle computer or other cases. The vehicle-use image processing system 100 performs image processing on the basis of the road surface image captured by a camera 14 mounted on the vehicle 10.

The vehicle-use image processing system 100 includes a luminance measuring unit 102, a reference area setting unit 110, a histogram preparing unit 120, a road surface cluster extracting unit 130, white line edge point detecting unit (lane mark detecting unit) 140, a primary white line candidate edge point detecting unit (primary lane mark candidate detecting unit) 141, a secondary white line candidate edge point detecting unit (secondary lane mark candidate detecting unit) 142, and a luminance parameter calculating unit 143. They are formed by a CPU, a ROM, a RAM, I/O (input/output circuits), and the like.

The luminance measuring unit 102 measures the luminance of the road surface image captured by the camera 14 for each pixel. The luminance measured for each pixel by the luminance measuring unit 102 is stored in a memory (not shown).

The reference area setting unit 110 sets a "reference area" corresponding to a road surface portion other than a lane mark in the road surface image captured by a camera 12.

The histogram preparing unit 120 prepares a "histogram" of luminance by measuring the frequency of luminance for each pixel of the road surface image in the reference area set by the reference area setting unit 110.

The road surface cluster extracting unit 130 extracts a cluster of portions, which are equal to or higher than a threshold value in width, height, or area, as a "road surface cluster" from the histogram prepared by the histogram preparing unit 120.

The primary white line candidate edge point detecting unit 141 detects all white line candidate edge points as "primary white line candidate edge points (primary lane mark candidates)."

The secondary white line candidate edge point detecting unit 142 detects primary white line candidate edge points that overlap (are included in) the reference area set by the reference area setting unit 110 out of the primary white line candidate edge points detected by the primary white line candidate edge point detecting unit 141 as "secondary white line candidate edge points (secondary lane mark candidates)."

The luminance parameter calculating unit 143 calculates a "luminance parameter" based on the luminance of a portion overlapping the reference area set by the reference area setting unit 110 out of the white line candidates including the secondary white line candidate edge points detected by the secondary white line candidate edge point detecting unit 142.

The white line edge point detecting unit 140 detects only secondary white line candidate edge points, whose "luminance parameter" calculated by the luminance parameter calculating unit 143 falls off the luminance range of "the road surface cluster" extracted by the road surface cluster extracting unit 130, as true white line edge points.

The functions of the vehicle-use image processing system having the above configuration (vehicle-use image processing method) will be described with reference to FIG. 2 to FIG. 12.

First, the reference area setting unit 110 performs "reference area setting processing" (S110 in FIG. 2).

Specifically, first, it is determined whether there is a detection result of white line edge points (white line edge point information) in the previous control cycle obtained by the white line edge point detecting unit 140 (S111 in FIG. 3).

If it is determined that there is the detection result of the white line edge points in the previous control cycle (S111 in FIG. 3: YES), the white line edge point information is read from the memory and the edge is approximately represented by a straight line or a curve based on the white line edge point information (S112 in FIG. 3). For example, the values of parameters "a" and "b" are calculated using the least squares approximation or other methods on the basis of a straight line (primary expression) Y=aX+b (X: the lateral position in the road surface image, Y: the vertical position in the road surface image) and the coordinates of a plurality of white line edge points identified by the white line edge point information read from the memory, by which the white line edge is approximately represented by the primary expression identified by the calculated values of the parameters. Further, the values of parameters "a," "b," "c," and the like are calculated using the least squares approximation or other methods on the basis of a quadratic expression $Y=aX^2+bX+c$ or other curve equations and the coordinates of a plurality of white line edge points identified by the white line edge point information read from the memory, by which the white line edge is approximately represented by the quadratic expression or other curve equations identified by the calculated values of the parameters. Note here that the "point" means a "pixel" and the "coordinates" means "the position of a pixel." The approximate expression of the white line edge can be corrected on the basis of an output of a yaw rate sensor, a speed sensor, or the like (not shown) mounted on the vehicle 10.

On the other hand, if it is determined that there is no detection result of the white line edge points in the previous control cycle (S111 in FIG. 3: NO), the reference area setting processing terminates without the setting of the reference area.

Subsequently, it is determined whether the approximate representations of the white line edges on both sides are adequate (S113 in FIG. 3). For example, the primary expression is determined to be adequate or not according to whether the values of a function g(a, b) of the parameters a and b of the primary expression fall within an allowable range that has been set in view of the position, the direction, the degree of fading, and the like of the white lines as lane marks.

Then, if the approximate representations of the white line edges on both sides are determined to be adequate (S113 in FIG. 3: YES), "the reference area" is set in the road surface image captured by the camera 14 (S114 in FIG. 3). More specifically, the lines (offset lines) on both sides are set in such a way as to be offset to the center of the lane from two straight lines or curves representing white line edges on both sides. Then, an area whose left and right are determined by the offset lines and whose top and bottom are determined by a pair of line segments extending transversely (X direction) is set as a "reference area."

For example, if the points on each edge E of the white lines M on both sides are detected as edge points as shown in FIG. 6, offset lines F are set closer to the center of the lane than the edges E on both sides, respectively. Then, as shown in FIG. 6, an approximately trapezoidal area A whose left and right are determined by the pair of offset lines F and whose top and bottom are determined by a line segment with Y coordinate "ROAD_DEN_SY" and a line segment with Y coordinate "ROAD_DEN_EY" is detected as "the reference area."

On the other hand, if it is determined that one or both of the approximate representations are inadequate in the white line edges on both sides of the lane (S113 in FIG. 3: NO), the reference area setting processing terminates without setting of the reference area.

If it is determined that there is no edge point information of the lane marks (S111 in FIG. 3: NO) or that one or both of the approximate representations of the edges on both sides are inadequate (S113 in FIG. 3: NO), the area A can be set as the "reference area" after the area stored in the memory beforehand is read out and then the shape with the offset lines is corrected on the basis of the output from a yaw rate sensor or a vehicle speed sensor (not shown), if necessary.

Subsequently, the histogram preparing unit 120 performs "histogram preparing processing" (S120 in FIG. 2).

More specifically, the luminance values of the points (pixels) included in the reference area set by the reference area setting unit 110 out of those of the points in the road surface image measured by the luminance measuring unit 102 and stored in the memory are read from the memory. Further, regarding each of the luminance intervals $B_k$ (k=0, 1, - - - , (N/HIST_DEN_STEP)−1 (N: Maximum value of luminance, HIST_DEN_STEP: Width of each luminance interval)), the pixel count values with measured luminance included therein are accumulated (the frequency of the measured luminance is measured). This creates a histogram with the ordinate axis representing the accumulated pixel count values (the frequency) and the abscissa axis representing the luminance (or luminance interval) as shown in FIG. 7. The frequency $h_k$ of each luminance interval $B_k$ is stored in the memory.

Subsequently, the road surface cluster extracting unit 130 performs "road surface cluster extraction processing" on the basis of the histogram prepared by the histogram preparing unit 120 (S130 in FIG. 2).

More specifically, while the luminance interval $B_r$ where the cumulative frequency $h_r$ is less than a threshold value in the histogram is detected as a "low frequency interval," the luminance interval $B_s$ where the cumulative frequency $h_s$ is equal to or more than the threshold value is detected as a "high frequency interval" (S131 in FIG. 4). On that basis, a "leftmost interval" and a "rightmost interval" of the road surface cluster candidate are detected according to the following (Definition 1) to (Definition 3) (S132 in FIG. 4):

(Definition 1): As shown in FIG. 8(a), a low frequency interval $B_{k-1}$ adjacent to a high frequency interval $B_k$ on the right side (high luminance side) is the "leftmost interval" of the road surface cluster candidate.

(Definition 2): As shown in FIG. 8(b), a low frequency interval $B_{k+1}$ adjacent to a high frequency interval $B_k$ on the left side (low luminance side) is the "rightmost interval" of the road surface cluster candidate.

(Definition 3): As shown in FIG. 8(c), a high frequency interval adjacent to a high frequency interval $B_{k-1}$ on the left side and adjacent to a high frequency interval $B_{k+1}$ on the right side and lower than both of the high frequency intervals $B_{k-1}$ and $B_{k+1}$ is the "rightmost interval" of the road surface cluster candidate on the left side and the "leftmost interval" of the road surface cluster candidate on the right side.

Thereafter, a cluster of portions from the leftmost interval to the rightmost interval is extracted as a "primary road surface cluster candidate" from the histogram (S133 in FIG. 4).

Subsequently, it is determined whether a plurality of primary road surface cluster candidates adjacent to each other satisfy the following (Condition 1) and (Condition 2) (S134 in FIG. 4):

(Condition 1): As shown in FIG. 9, both of the rightmost interval of the primary road surface cluster candidate $C_1$ and the leftmost interval of the primary road surface cluster candidate $C_2$ are the same interval $B_k$.

(Condition 2): As shown in FIG. 9, $g_n$ is sequentially calculated according to the following expression (1) on the basis of the overlap interval $B_k$ between the first road surface cluster candidates $C_1$ and $C_2$ and the frequencies $h_{k-2}$ to $h_{k+2}$ of the five luminance intervals $B_{k-2}$ to $B_{k+2}$ in total including two luminance intervals on both adjacent sides, and then the following expression (2) is satisfied.

$$g_n = \{(\tau-1)/(\tau+1)\}g_{n-1} + \{1/(\tau+1)\}(h_{n-1}+h_n) \quad (1)$$

(where $k-1 \leq n \leq k+2$, $g_{k-2} = h_{k-2}$, $\tau$: Constant)

$$|g_{k+2} - h_{k+2}| \leq \delta \quad (2)$$

(Condition 2) is apt to be satisfied when the valley between the primary road surface cluster candidates adjacent to each other is shallow. (Condition 2) is for use in extracting one road surface cluster by removing the effect of noise in the case where irregularity is caused by the noise in the histogram. Therefore, the constant $\tau$ in expression (1) corresponds to a time constant that determines the characteristic of a filter for noise reduction and can be appropriately set according to how much noise is removed.

Then, if it is determined that (Condition 1)) and (Condition 2) are satisfied (S134 in FIG. 4: YES), the plurality of road surface cluster candidates are integrated and extracted as a "secondary road surface cluster candidate" (S135 in FIG. 4). For example, if the valley between the primary road surface cluster candidates $C_1$ and $C_2$ shown in FIG. 9 is shallow (if the frequency $h_k$ of the luminance interval $B_k$ is low in a drop from the frequencies $h_{k-2}$, $h_{k-1}$, $h_{k+1}$, and $h_{k+2}$ of the two luminance intervals on both sides $B_{k-2}$, $B_{k-1}$, $B_{k+1}$, and $B_{k+2}$), the primary road surface cluster candidates $C_1$ and $C_2$ are integrated and extracted as one "secondary road surface cluster candidate."

Subsequently, it is determined whether the primary road surface cluster candidate or primary and secondary road surface cluster candidates $C_j$ satisfy (Condition 3) regarding its cumulative frequency $v_j$ and the number of intervals $s_j$ (S136 in FIG. 4).

(Condition 3): The following inequality (3a) and inequality (3b) are satisfied.

$$v_j \geq s_j \cdot \text{CLUSTER\_SET\_RATIO} \quad (3a)$$

$$s_j \geq \text{CLUSTER\_SECTION\_N} \quad (3b)$$

Then, a road surface cluster candidate satisfying (Condition 3) is extracted as a "road surface cluster" (S137 in FIG. 4). The coefficient "CLUSTER_SET_RATIO" in the inequality (3a) is for use in determining the height (approximate vertical shape) of the road surface cluster to be extracted. On the other hand, the coefficient "CLUSTER_SECTION_N" in the inequality (3b) is for use in determining the width (approximate horizontal shape) of the "road surface cluster" to be extracted. For example, the larger the coefficient CLUSTER_SET_RATIO and the smaller the coefficient CLUSTER_SECTION_N is set, the longer in the vertical direction the extracted road surface cluster is. Further, the smaller the coefficient CLUSTER_SET_RATIO and the larger the coefficient CLUSTER_SECTION_N is set, the longer in the horizontal direction the extracted road surface cluster is.

Subsequently, the white line edge point detecting unit 140 performs "white line edge point detection processing" on the basis of the road surface cluster extracted by the road surface cluster extracting unit 130 (S140 in FIG. 2).

More specifically, first, the primary white line candidate edge point detecting unit 141 detects the edge points of all white lines (and false white lines) as "primary white line candidate edge points" on the basis of the luminance of the points of the road surface image measured by the luminance measuring unit 102 and stored in the memory (S141 in FIG. 5). A method of detecting the edge points can be, for example, one which is disclosed in Japanese Patent Laid-Open No. Hei 11(1999)-85999, and therefore its detailed description is omitted in this specification. For example, the points on an edge E' of the road surface portion (false white line) M' between the shadows S closer to the center of lane are detected as "primary white line candidate edge points" in addition to the points on the edges E of the white lines M on both sides closer to the center of the lane as shown in FIG. 11, on the basis of the road surface image having the shadows S of a guardrail G as shown in FIG. 10. Further, based on the road surface image which includes white lines M on both sides, but does not include a false white line generated by the shadows of a guardrail or the like as shown in FIG. 6, the points on the edges E of the white lines M closer to the center of the lane are detected as "primary white line candidate edge points."

The edge points of the left white line M are detected as "negative edge points" at which the road surface image changes from high luminance (bright) to low luminance (dark), while the edge points of the right white line M are detected as "positive edge points" at which the road surface image changes from low luminance (dark) to high luminance (bright).

Subsequently, it is determined whether the edge identified by the primary white line candidate edge point satisfies the following (Condition 4) on the basis of a distance "$\rho_L$" from the origin (the center of the lower edge) of the road surface image to the edge identified by edge points (including one approximately represented as described above) and a distance "$\rho_{inner}$" from the origin to the offset line which defines the left and right of the reference area (see. FIG. 6) (S141a in FIG. 5). (Condition 4): There is an edge satisfying the following inequality (4).

$$\rho_{inner} - \rho_L > \text{INNER\_MIN\_RO} \quad (4)$$

(Condition 4) is satisfied when the edge and a primary white line candidate having the edge overlap the reference area. Then, if (Condition 4) is determined to be satisfied (S141a in FIG. 5: YES), the secondary white line candidate edge point detecting unit 142 detects the points on the edge as "secondary white line candidate edge points" (S142 in FIG. 5).

For example, if (Condition 4) is satisfied because a distance from the origin O shown in FIG. 11 to an edge E' of a false white line M' is less than a distance from the origin O to the left offset line F, the points on the edge E' of the false white line M' are detected as "secondary white line candidate edge points."

On the other hand, unless (Condition 4) is determined to be satisfied (S141a in FIG. 5: NO), the white line edge point detecting unit 140 detects the points on the edge as "true white line edge points" (S145 in FIG. 5).

For example, if the road surface image includes only the left and right white lines M as shown in FIG. 6, the white line edge point detecting unit 140 just detects the edges E of the left and right white lines M whose distance from the origin O is more than the distance from the origin O to the left and right offset lines F. Therefore, in this case, (Condition 4) is not satisfied and the points on the edges E of the white lines M are detected as "true white line edge points" (S145 in FIG. 5).

Subsequently, the luminance parameter calculating unit 143 calculates "luminance parameters" on the basis of the respective secondary white line candidate edge points detected by the secondary white line candidate edge points detecting unit 142 (S143 in FIG. 5).

Specifically, if the edge included in the reference area out of the secondary white line candidate edge points corresponds to "negative edge points," the luminance values of a set of N points in total $\{p_{i-N+1j}, ---, p_{i-1j}, p_{ij}\} = \{(x_{i-N+1}, y_j), ---, (x_{i-1}, y_j), (x_i, y_j)\}$ of the negative edge point $p_{ij} = (x_i, y_j)$ and points left thereof (points included in the white line candidates) are read from the memory as shown in FIG. 12(a).

On the other hand, if the edge included in the reference area out of the secondary white line candidate edge points corresponds to "positive edge points," the luminance values of a set of N points in total $\{p_{ij}, p_{i+1j}, ---, p_{i+N-1j}\} = \{(x_i, y_j), (x_{i+1}, y_j), ---, (x_{i+N-1, yj})\}$ of the positive edge point $p_{ij} = (x_i, y_j)$ and points right thereof (points included in the white line candidates) are read from the memory as shown in FIG. 12(b).

The luminance readout processing is repeated sequentially for the respective white line candidates from the lower edge of the reference area (Y=ROAD_DEN_SY) to the upper edge (Y=ROAD_DEN_EY) thereof. After the completion of readout processing of all luminance values for the white line candidates, the average of the luminance values of the white line candidates is calculated as a "luminance parameter" of the white line candidates. Alternatively, an arithmetic weighted mean value of the luminance values, whose weighting factor depends upon a distance from the edge in the X direction, a distance from the lower edge of the reference area in the Y direction, or the like, can be calculated as the "luminance parameter."

Subsequently, it is determined whether the luminance parameters of the white line candidates fall within the luminance range of one of the road surface clusters (S144 in FIG. 5).

If it is determined that the luminance parameters of the white line candidates fall within the luminance range of one of the road surface clusters (S144 in FIG. 5: YES), the edge points of the white line candidates are not detected as true white line edge points, and then the white line edge point detection processing is terminated.

On the other hand, unless it is determined that the luminance parameters of the white line candidates fall within the luminance range of one of the road surface clusters (S144 in FIG. 5: NO), the secondary white line candidate edge points are detected as "true white line edge points" (S145 in FIG. 5).

The "true white line edge points" detected by the white line edge point detecting unit 140 is stored as white line edge point information in the memory, read from the memory in reference area setting processing (S110 in FIG. 2) in the next control cycle, and used as a base of the reference area.

According to the vehicle-use image processing system which performs the above functions, "a road surface cluster (See S130 in FIG. 2)" is extracted from "the histogram (See S120 in FIG. 2 and FIG. 7)" of the luminance of the pixels in "the reference area (See S110 in FIG. 2 and FIG. 11)" in the road surface image. Further, edge points overlapping the "reference area" out of the "primary white line candidate edge points" are detected as "secondary white line candidate edge points" (See FIG. 11). Then, only edge points that have "luminance parameter" values not falling within the luminance range of the "road surface cluster" out of the "secondary white line candidate edge points" can be detected as "true white line edge points" (See S144 and S145 in FIG. 5).

Since the "reference area" corresponds to the vehicle traffic lane between a pair of left and right white lines (lane marks), the "histogram" of luminance of its points can be considered as equivalent to the histogram of luminance of the points of the road surface portions other than the lane marks (the "white line edge points" or the "edges" including them in this embodiment). Therefore, the luminance range of one "road surface cluster" having an area (or a height or width) equal to or higher than a threshold value extracted from the "histogram" corresponds to the luminance distribution of the road surface portions other than the lane marks. In addition, the luminance parameters of the "lane mark candidates" falling within the luminance range of the "road surface cluster" means that the lane mark candidates have substantially the same luminance distribution as the road portions other than the lane marks. Further, as described above, the "secondary lane mark candidates" that have the "luminance parameter" values falling within the luminance range of the "road surface cluster" (false lane marks) are prevented from being detected as true lane marks, by which the lane marks can be prevented from being erroneously detected (erroneous detection). Thereby, true lane marks can be detected with high accuracy (See S145 in FIG. 5).

In addition, the left and right of the reference area are defined by offset lines which are offset to the center of the lane from the pair of true left and right lane marks (See FIG. 11). This allows the reference area to correspond to the road surface portion other than the true lane marks accurately.

Further, the "histogram" and the "road surface cluster" are associated with the luminance distributions of the road surface portions other than the lane marks more accurately, by which true lane marks can be detected with higher accuracy.

Further, the reference area setting unit 110 suppresses the area of the reference area since the top and bottom of the reference area are defined by the lines offset from the upper edge and the lower edge of the road surface image, respectively, by which the resources required for the image processing can be saved. Moreover, if the image processing result (the detection result of the white line edge points) is used for the lateral position control of the vehicle, the top and bottom of the reference area are defined so as to be associated with the range in the traveling direction of the vehicle 10, where the lateral position of the vehicle 10 is controlled based on the detection result, whereby an appropriate lateral position control of the vehicle 10 can be achieved.

Further, a cluster having a shape whose middle part is higher than both ends is extracted as a "primary road surface cluster candidate" from the histogram (See FIG. 7) (See S133 in FIG. 4 and FIG. 9). Moreover, if both ends of a plurality of "primary road surface cluster candidates" overlap each other and a valley portion generated in the overlap region is shallow in view of the noise components included in the histogram, the plurality of primary road surface cluster candidates are integrated and extracted as one "secondary road surface cluster candidate" (See S135 in FIG. 4 and FIG. 9). Then, a road surface cluster candidate that satisfies the above (Condition 3), in other words, a road surface cluster candidate whose area is equal to or higher than a threshold value is extracted as a "road surface cluster." This reduces or eliminates the effect of noise components and allows the extraction of a road surface cluster having an appropriate luminance range as one representing the luminance distribution of the road surface portions other than the lane marks. Thereby, true lane marks can be detected with higher accuracy.

Further, lane mark candidates that overlap the reference area out of all lane mark candidates, namely "primary lane mark candidates" are detected as "secondary lane mark candidates" (See S142 in FIG. 5). Moreover, out of the secondary lane mark candidates, those that have luminance parameters which fall within the luminance range of the road surface cluster are not detected as true lane marks as described above (See S144 in FIG. 5: YES). In addition, the secondary lane mark candidates are narrowed down to those that overlap the reference area, whereby those unlikely to be true lane marks can be removed. Further, the primary lane mark candidates are narrowed down to the secondary lane marks, whereby the load on the luminance parameter calculation processing can be reduced.

Although the edges or edge points of the continuous or intermittent "white lines" closer to the center of the lane have been detected as "lane marks" in this embodiment, it is also possible to detect edges or edge points of lines having a color other than white such as yellow, blue, or the like, reflectors arranged intermittently along the road, or edges or edge points such as Botts Dots as "lane marks" in another embodiment.

Further, although the edge points closer to the center of the lane of the stripe-shaped road surface portion between the pair of shadows of the guardrail have been detected as "primary and secondary white line candidate edge points" (See FIG. 10 and FIG. 11) in this embodiment, it is also possible to detect all kinds of edge points on road surface portions likely to be erroneously detected as lane marks (edge points) such as the edge points of the track of a dual tire of a truck or the like, the track of a tire, a stripe-shaped road surface portion between the shadows of a guardrail or the like as "primary or primary and secondary lane mark candidates" in another embodiment.

Although the edge points closer to the center of the lane of the white lines have been detected as the points on the "lane marks" in this embodiment, it is also possible to detect points offset to the outer side of the lane within the range of the white line from the edge points closer to the center of the lane of the white lines as points on the "lane marks" in another embodiment.

Although one area has been set as the reference area A as shown in FIG. 11 in this embodiment, a plurality of areas can be set as the reference area A as shown in FIG. 13 in another embodiment. Moreover, although the reference area A has been set in the road surface portion corresponding to the vehicle traffic lane (subject vehicle lane) between the pair of left and right white lines (lane marks) M as shown in FIG. 11 in this embodiment, the reference area can be set in the road surface portion outside the subject vehicle lane as shown in FIG. 14 in another embodiment.

Figure 1:
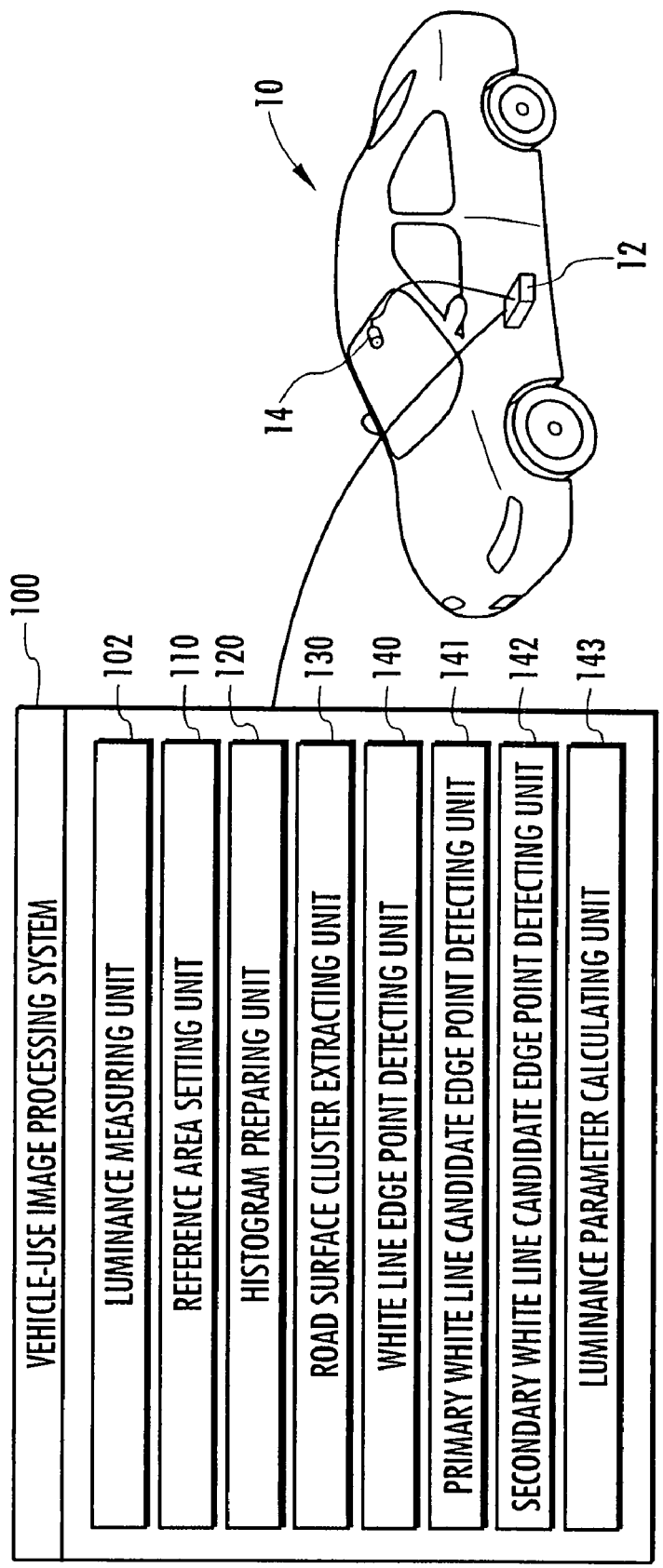
FIG. 1 is a configuration schematic diagram of a vehicle-use image processing system according to one embodiment of the present invention.
Figure 2:
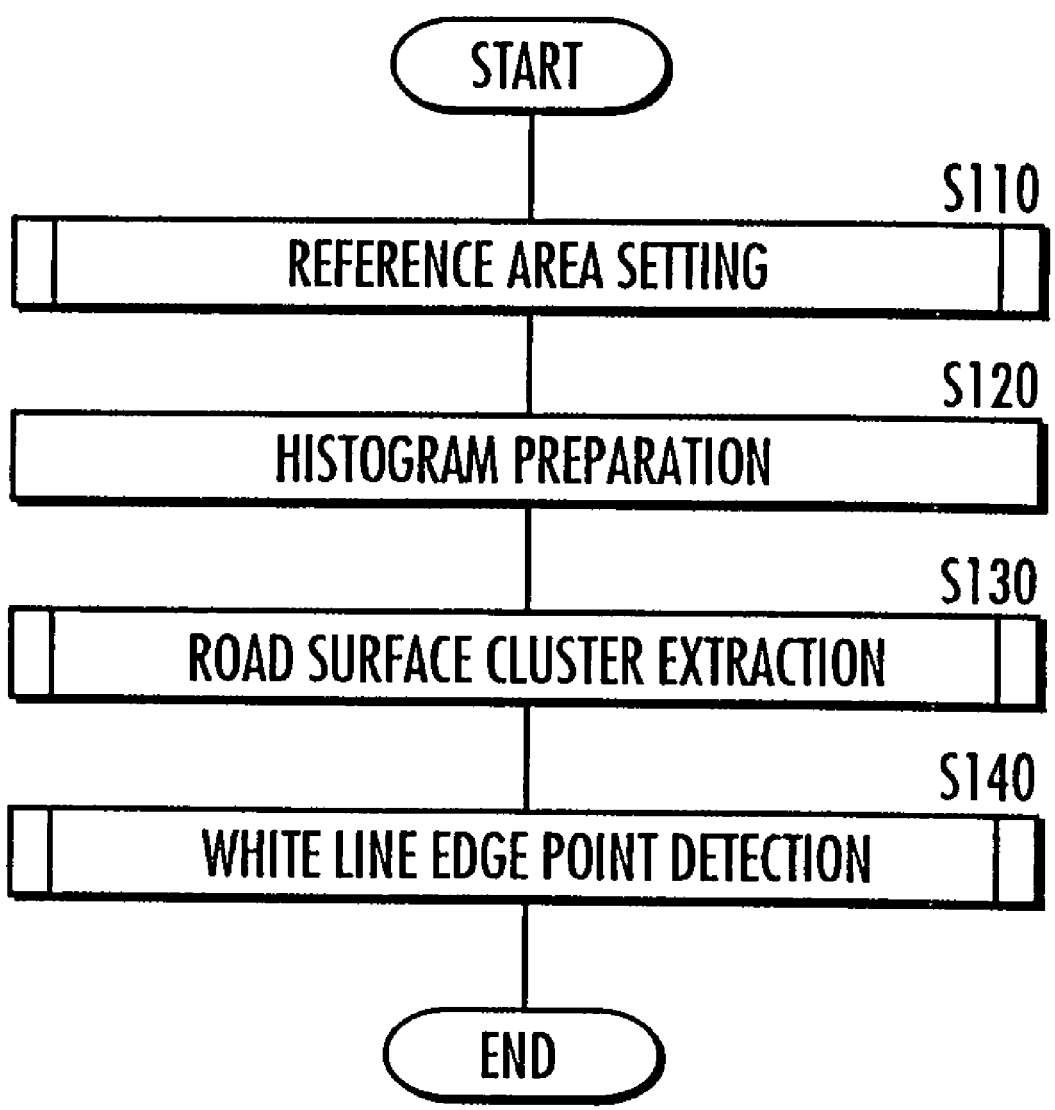
FIG. 2 is a function schematic diagram of a vehicle-use image processing system according to one embodiment of the present invention.
Figure 3:
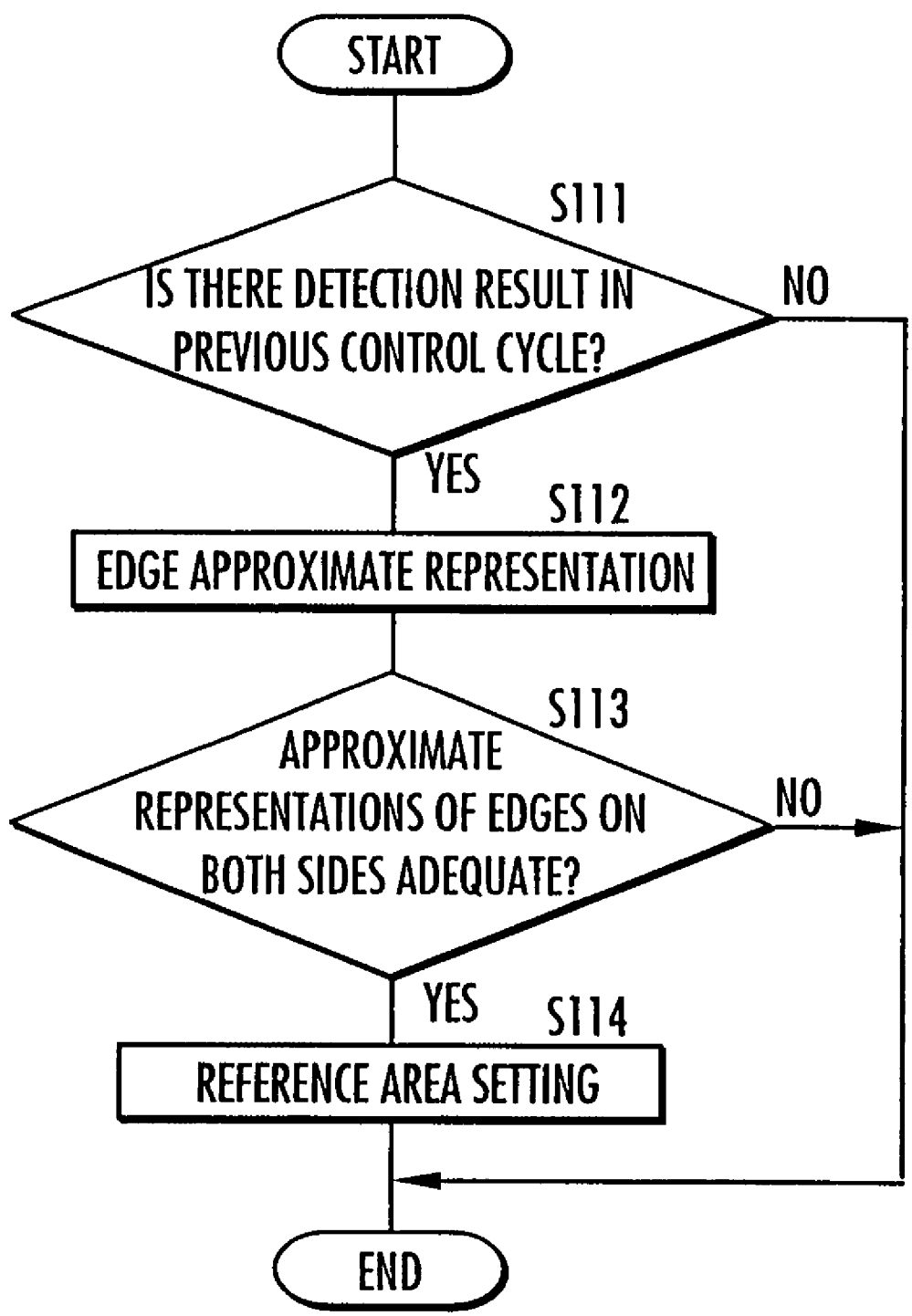
FIG. 3 is a schematic diagram of reference area setting processing.
Figure 4:
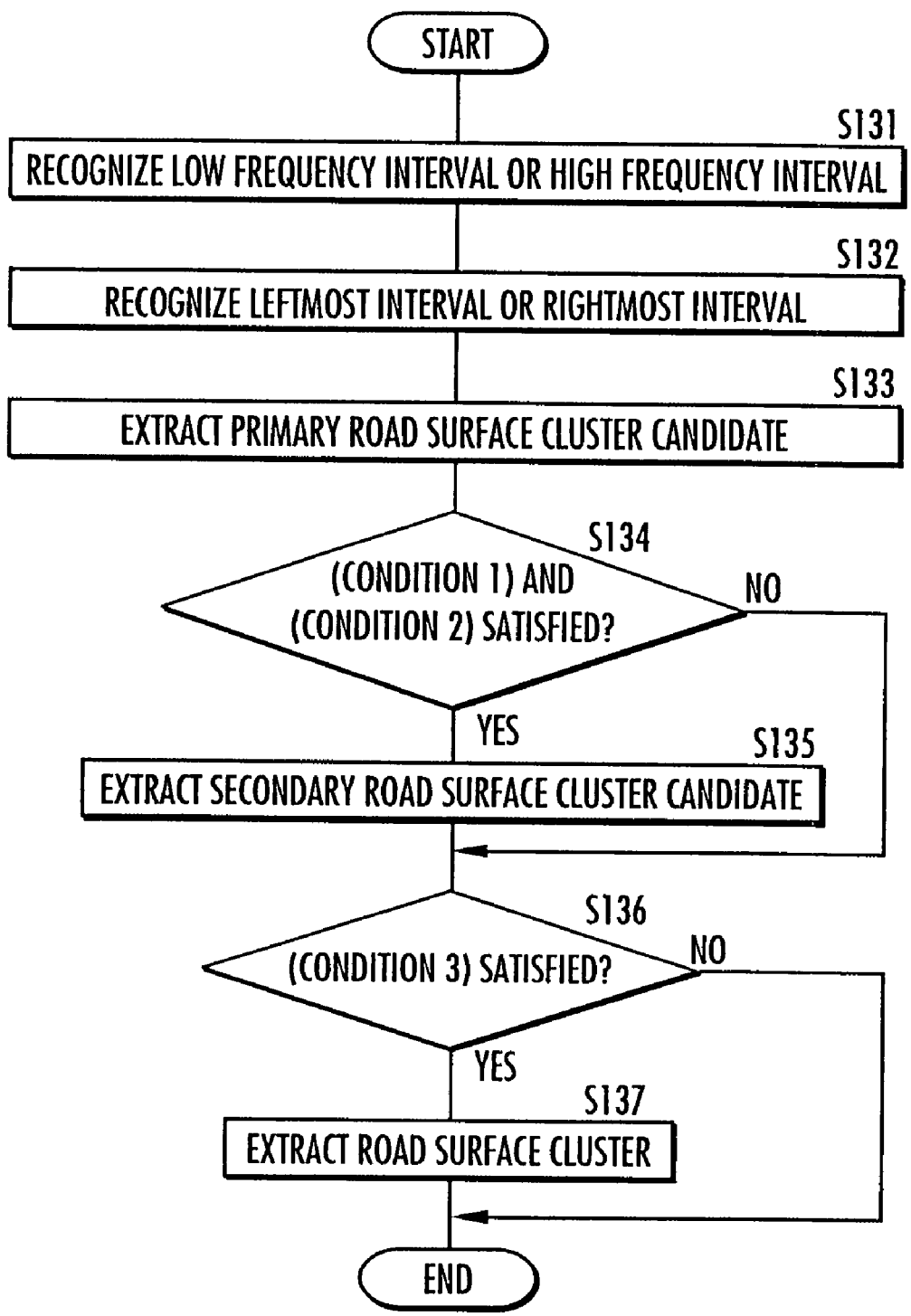
FIG. 4 is a schematic diagram of road surface cluster extraction processing.
Figure 5:
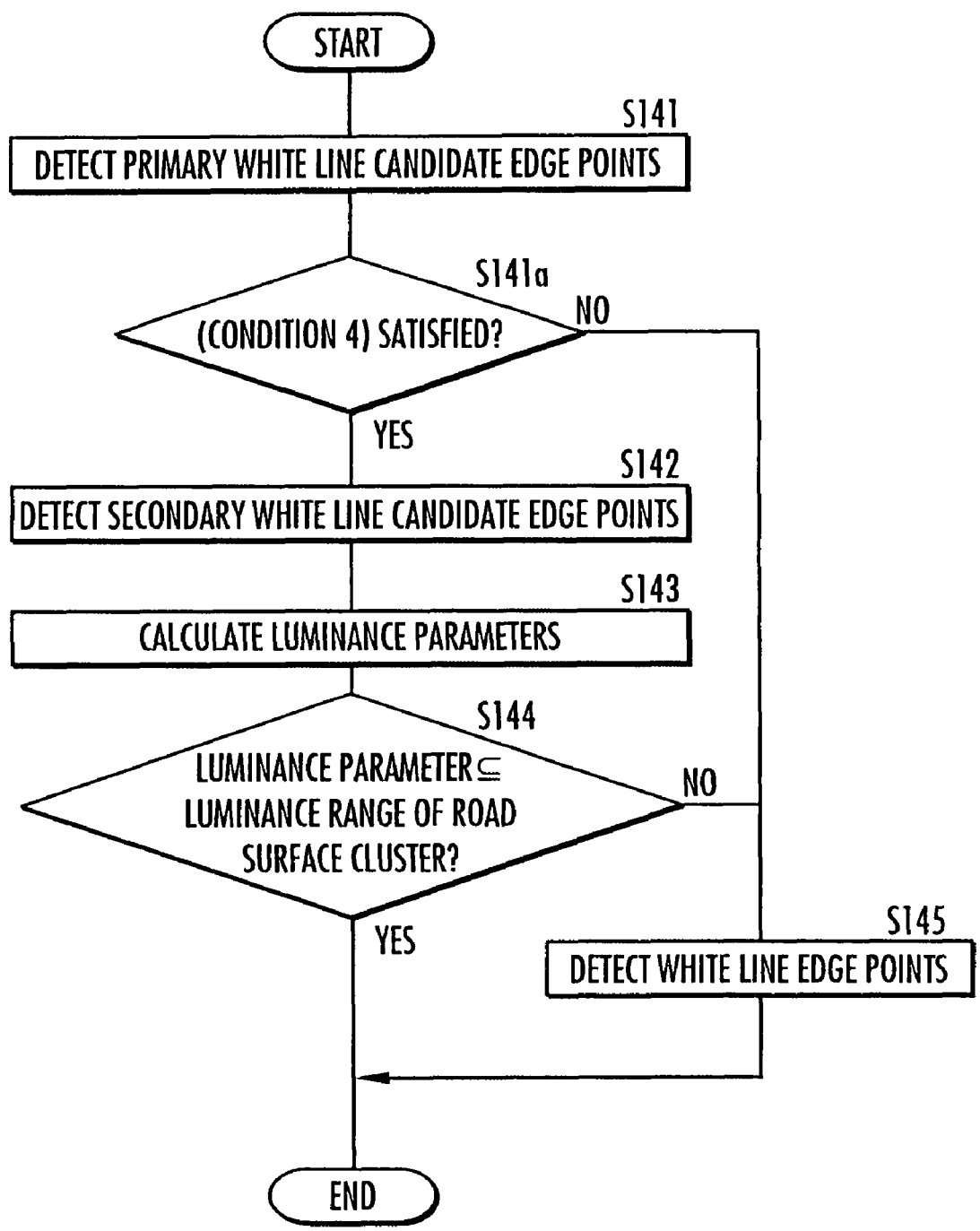
FIG. 5 is a schematic diagram of white line edge point detection processing.
Figure 6:
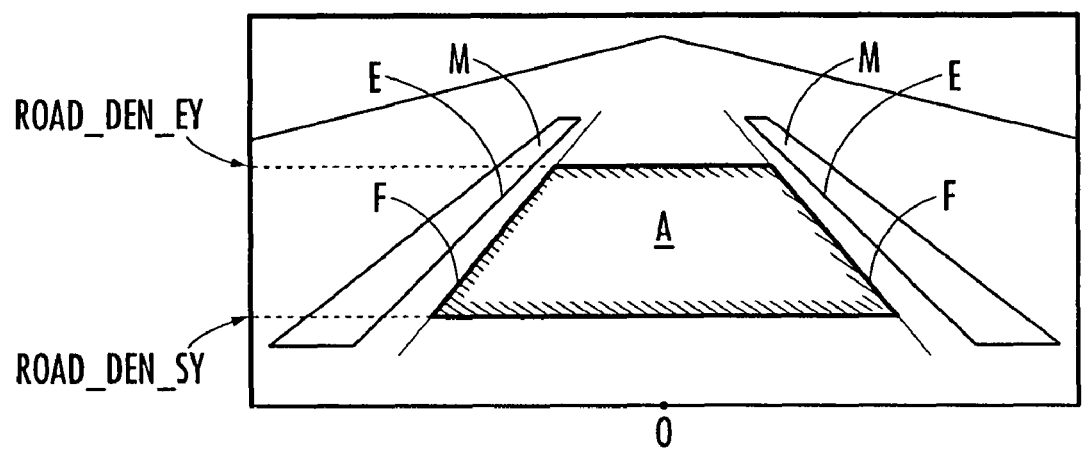
FIG. 6 is an exemplifying diagram of a reference area.
Figure 7:
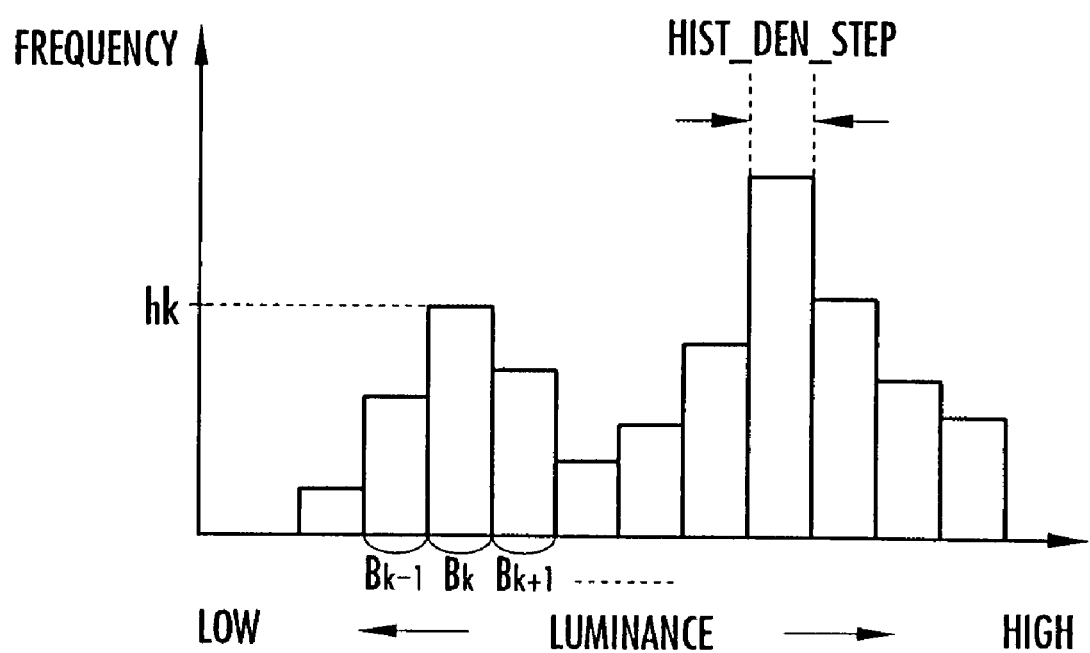
FIG. 7 is an exemplifying diagram of a histogram of measured frequency of luminance.
Figure 8A:
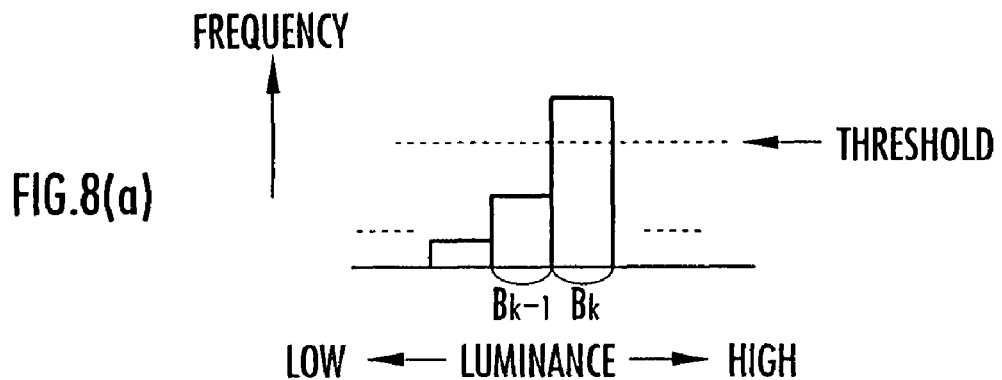
FIG. 8 is a schematic diagram of intervals to the left and right of a road surface cluster candidate at both ends thereof.
Figure 8B:
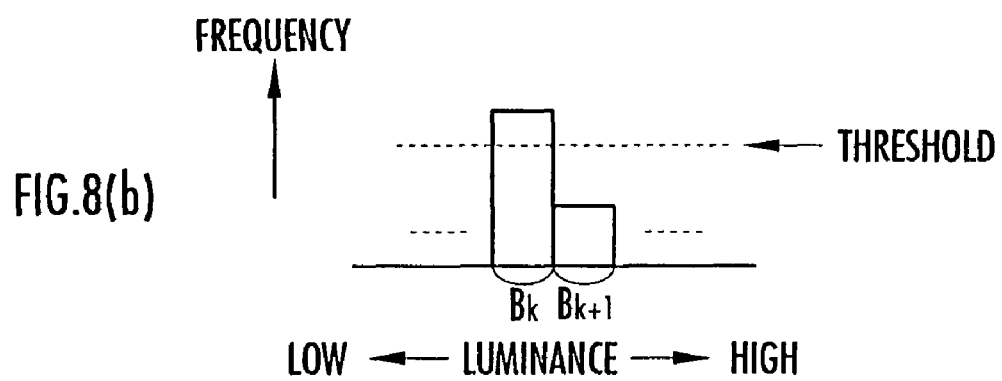
Figure 8C:
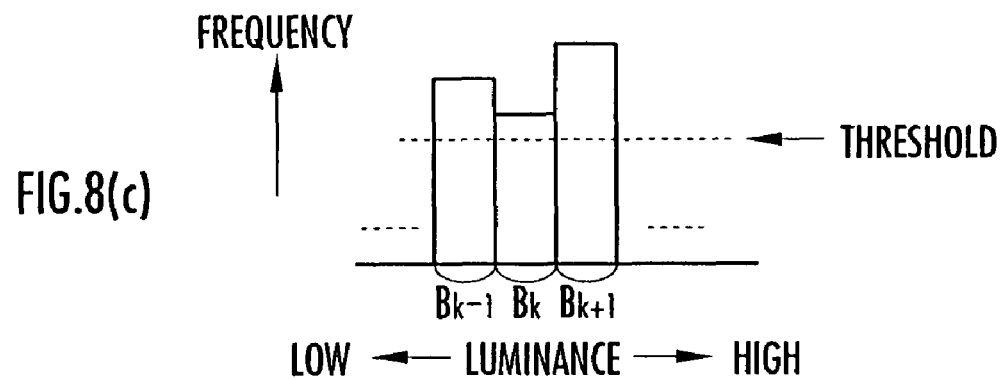
Figure 9:
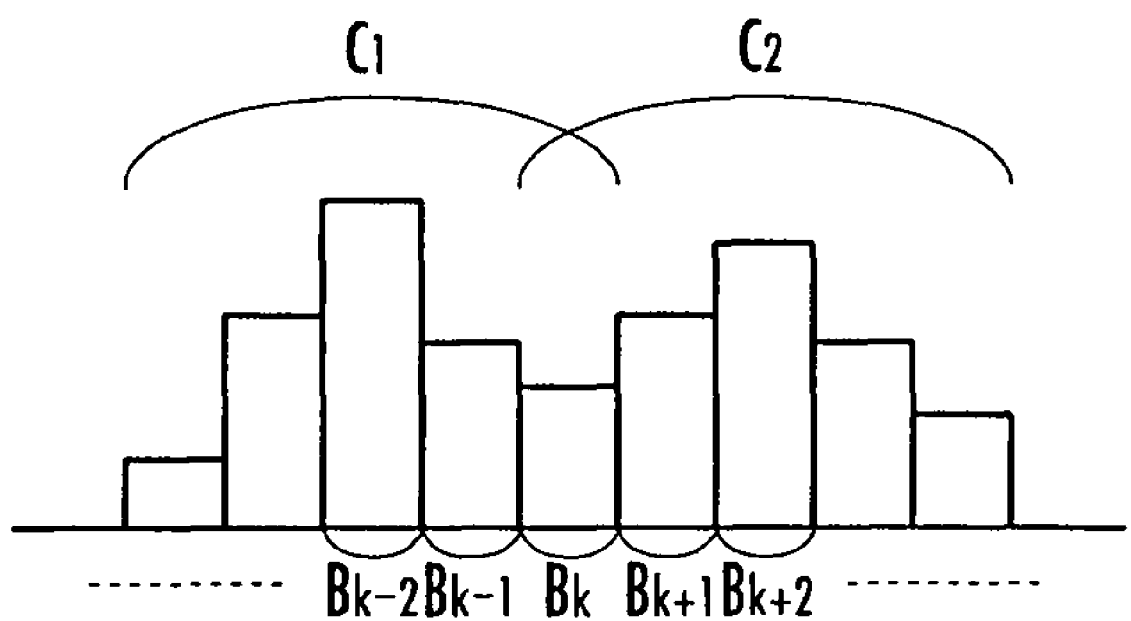
FIG. 9 is an exemplifying diagram of two road surface clusters to be integrated with each other.
Figure 10:
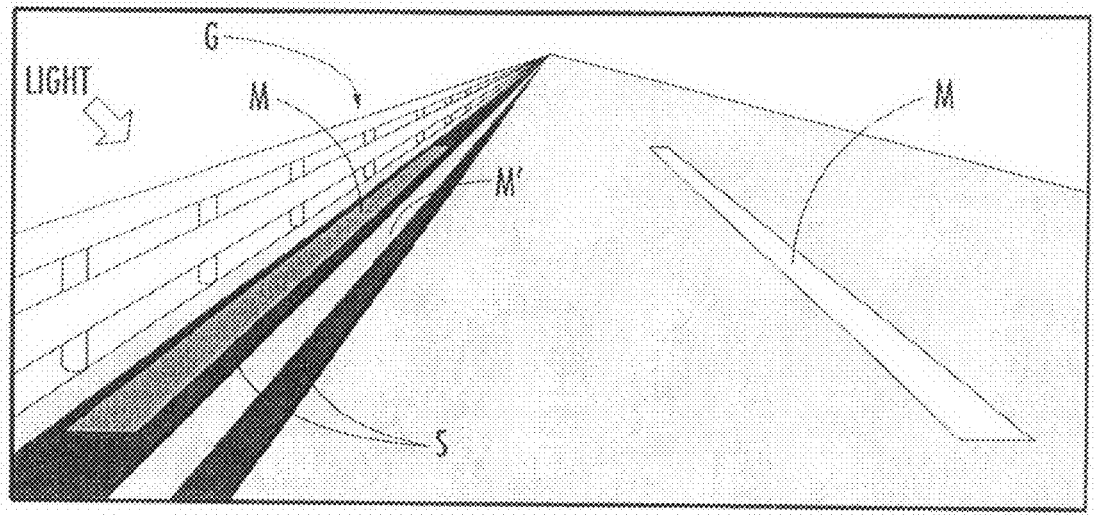
FIG. 10 is an exemplifying diagram of a road surface image.
Figure 11:
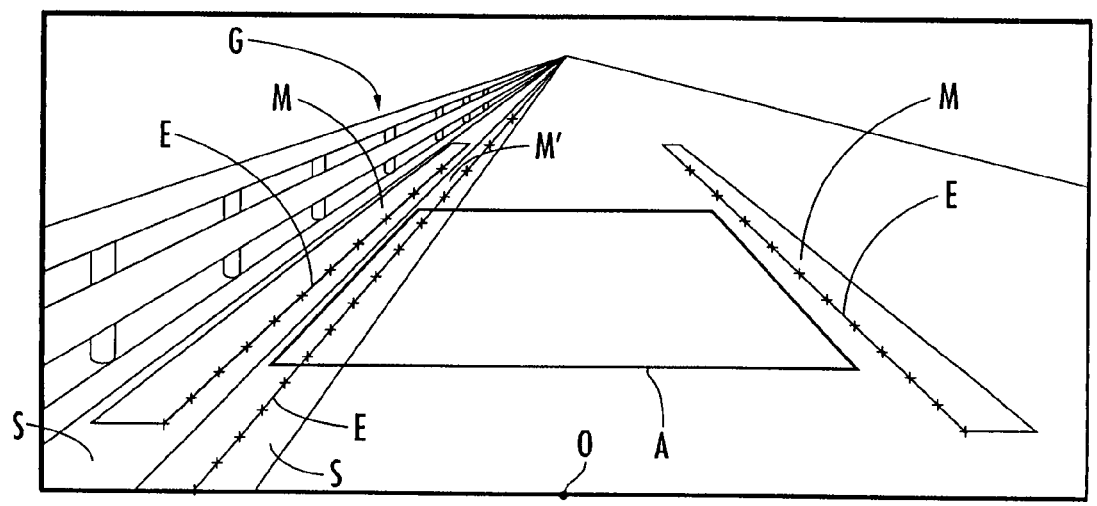
FIG. 11 is an exemplifying diagram of white line candidate edge points, white line edge points, and the reference area.
Figure 12A:
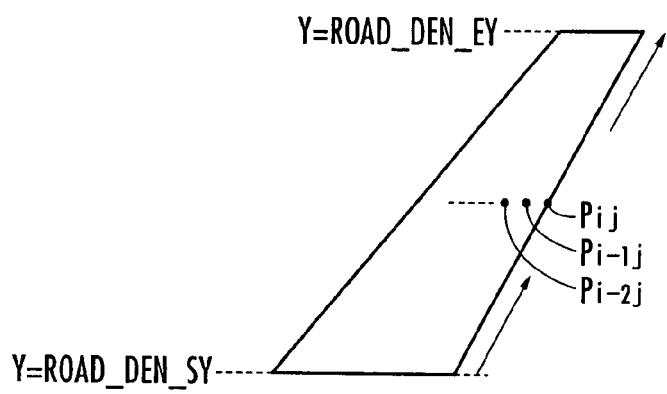
FIG. 12 is an exemplifying diagram of pixels to be a base of luminance parameters.
Figure 12B:
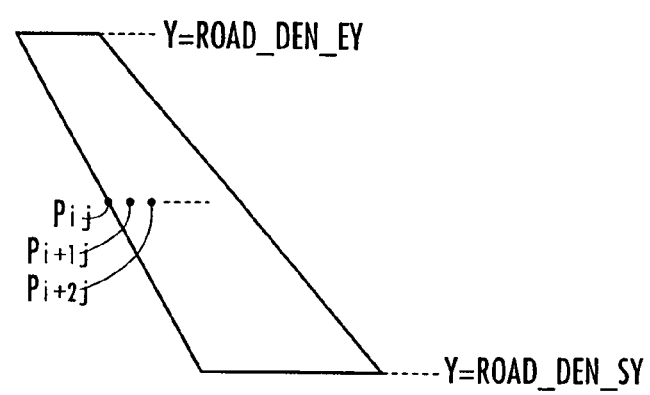
Figure 13:
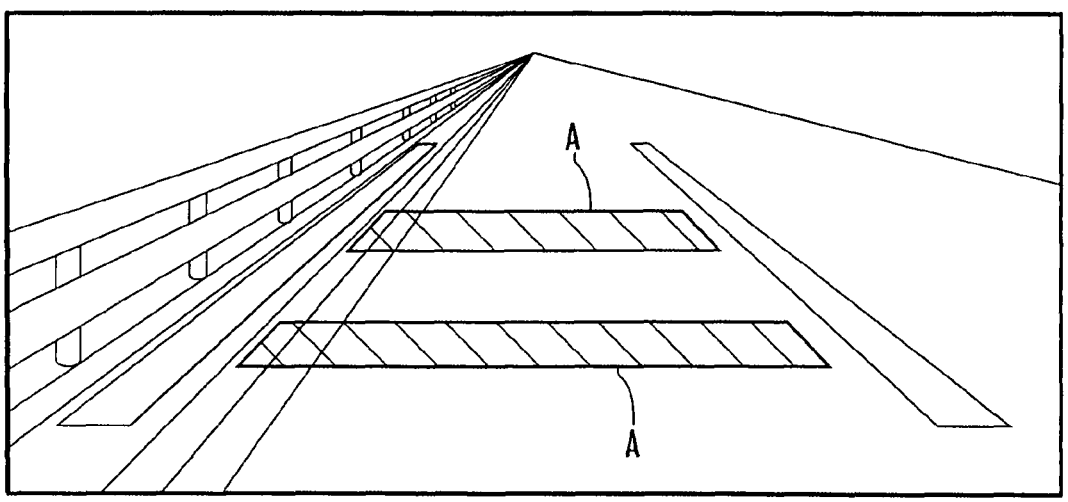
FIG. 13 is another exemplifying diagram of a reference area.
Figure 14:
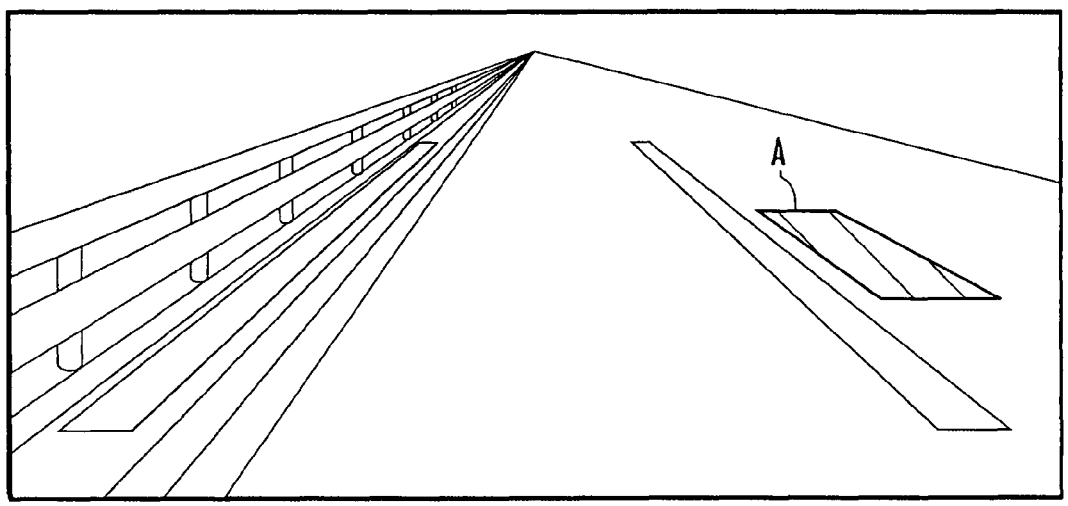
FIG. 14 is still another exemplifying diagram of a reference area.

The invention claimed is:

1. A vehicle-use image processing system which performs image processing on the basis of a road surface image captured by an imaging device mounted on a vehicle, comprising:

a reference area setting unit which sets a reference area corresponding to a road surface portion other than a lane mark in the road surface image captured by the imaging device;

a histogram preparing unit which prepares a histogram by measuring the frequency of luminance of each pixel of the road surface image in the reference area set by the reference area setting unit;

a road surface cluster extracting unit which extracts a cluster of portions, which are equal to or higher than a threshold value in width, height, or area, as a road surface cluster from the histogram prepared by the histogram preparing unit;

a lane mark candidate detecting unit which detects a lane mark candidate on the basis of the road surface image captured by the imaging device;

a luminance parameter calculating unit which calculates luminance parameters based on the luminance of the lane mark candidate detected by the lane mark candidate detecting unit; and a lane mark detecting unit which detects a lane mark candidate whose luminance parameters calculated by the luminance parameter calculating unit fall within the luminance range of the road surface cluster extracted by the road surface cluster extracting unit as a false lane mark, while detecting a lane mark candidate whose luminance parameters calculated by the luminance parameter calculating unit fall off the luminance range of the road surface cluster extracted by the road surface cluster extracting unit as a true lane mark.

2. A vehicle-use image processing system according to claim 1, wherein the reference area setting unit sets an area whose left and right are defined by a pair of offset lines, which are offset closer to the center of the lane than a pair of true lane marks detected by the lane mark detecting unit, as the reference area.

3. A vehicle-use image processing system according to claim 1, wherein the reference area setting unit sets the reference area whose top and bottom are defined by lines offset from the upper edge and lower edge of the road surface image, respectively.

4. A vehicle-use image processing system according to claim 1, wherein the road surface cluster extracting unit extracts a cluster having a shape whose middle part is higher than both ends as a primary road surface cluster candidate from the histogram prepared by the histogram preparing unit and extracts a primary road surface cluster candidate which is equal to or higher than the threshold value in area as the road surface cluster.

5. A vehicle-use image processing system according to claim 4, wherein, if both ends of a plurality of the primary road surface cluster candidates overlap each other and a valley portion generated in the overlap region is shallow in view of the noise components included in the histogram, the road surface cluster extracting unit integrates and extracts the plurality of primary road surface cluster candidates as one secondary road surface cluster candidate and then extracts a secondary road surface cluster candidate which is equal to or higher than a threshold value in area as the road surface cluster.

6. A vehicle-use image processing system according to claim 1, wherein:

the lane mark candidate detecting unit is composed of a primary lane mark candidate detecting unit which detects all lane mark candidates as primary lane mark candidates and a secondary lane mark candidate detecting unit which detects primary lane mark candidates whose distance from a point on the center line of a vehicle traffic lane is equal to or lower than a threshold value out of the primary lane mark candidates detected by the primary lane mark candidate detecting unit as secondary lane mark candidates; and the luminance parameter calculating unit calculates luminance parameters based on the luminance of the secondary lane mark candidates detected by the secondary lane mark candidate detecting unit.

7. A vehicle-use image processing system according to claim 2, wherein:

the lane mark candidate detecting unit is composed of a primary lane mark candidate detecting unit which detects all lane mark candidates as primary lane mark candidates and a secondary lane mark candidate detecting unit which detects primary lane mark candidates which overlap the reference area set by the reference area setting unit out of the primary lane mark candidates detected by the primary lane mark candidate detecting unit as secondary lane mark candidates; and the luminance parameter calculating unit calculates luminance parameters based on the luminance of the secondary lane mark candidates detected by the secondary lane mark candidate detecting unit.

8. A vehicle-use image processing system according to claim 7, wherein the luminance parameter calculating unit calculates the luminance parameters based on the luminance of the portions overlapping the reference area set by the reference area setting unit out of the secondary lane mark candidates detected by the secondary lane mark candidate detecting unit.

9. A vehicle-use image processing system according to claim 1, wherein, if the lane mark candidate detecting unit detects no lane mark candidate, the lane mark detecting unit detects the lane marks detected earlier as true lane marks.

10. A vehicle-use image processing system according to claim 1, wherein the lane mark candidate detecting unit detects edges or edge points of the lane marks closer to the center of the lane as lane mark candidates.

11. A vehicle-use image processing method of performing image processing on the basis of a road surface image captured by an imaging device mounted on a vehicle, comprising:

a reference area setting step of setting a reference area corresponding to a road surface portion other than a lane mark in the road surface image captured by the imaging device;

a histogram preparing step of preparing a histogram by measuring the frequency of luminance of each pixel of the road surface image in the reference area set in the reference area setting step;

a road surface cluster extracting step of extracting a cluster of portions, which are equal to or higher than a threshold value in width, height, or area, as a road surface cluster from the histogram prepared in the histogram preparing step;

a lane mark candidate detecting step of detecting a lane mark candidate on the basis of the road surface image captured by the imaging device;

a luminance parameter calculating step of calculating luminance parameters based on the luminance of the lane mark candidate detected in the lane mark candidate detecting step; and a lane mark detecting step of detecting a lane mark candidate whose luminance parameters calculated in the luminance parameter calculating step fall within the luminance range of the road surface cluster extracted in the road surface cluster extracting step as a false lane mark, while detecting a lane mark candidate whose luminance parameters calculated in the luminance parameter calculating step fall off the luminance range of the road surface cluster extracted in the road surface cluster extracting step as a true lane mark.

12. A vehicle-use image processing program stored on a non-transitory computer readable medium for giving functions of performing image processing on the basis of a road surface image captured by an imaging device mounted on a vehicle, wherein the program gives the computer:

a reference area setting function of setting a reference area corresponding to a road surface portion other than a lane mark in the road surface image captured by the imaging device;

a histogram preparing function of preparing a histogram by measuring the frequency of luminance of each pixel of the road surface image in the reference area set by the reference area setting function;

a road surface cluster extracting function of extracting a cluster of portions, which are equal to or higher than a threshold value in width, height, or area, as a road surface cluster from the histogram prepared by the histogram preparing function;

a lane mark candidate detecting function of detecting a lane mark candidate on the basis of the road surface image captured by the imaging device;

a luminance parameter calculating function of calculating luminance parameters based on the luminance of the lane mark candidate detected by the lane mark candidate detecting function; and a lane mark detecting function of detecting a lane mark candidate whose luminance parameters calculated by the luminance parameter calculating function fall within the luminance range of the road surface cluster extracted by the road surface cluster extracting function as a false lane mark, while detecting a lane mark candidate whose luminance parameters calculated by the luminance parameter calculating function fall off the luminance range of the road surface cluster extracted by the road surface cluster extracting function as a true lane mark.

13. A method of downloading a part or all of the vehicle-use image processing program according to claim 12 to an in-vehicle computer in order to set up a vehicle-use image processing system.

14. A vehicle comprising a vehicle-use image processing system according to one of claims 1 to 10.

* * * * *